US012260985B2

United States Patent
Nunamaker et al.

(10) Patent No.: US 12,260,985 B2
(45) Date of Patent: Mar. 25, 2025

(54) THREE-PHASE MULTI-TAP BALANCING DISTRIBUTION TRANSFORMER

(71) Applicant: Southwest Electric Co., Oklahoma City, OK (US)

(72) Inventors: James Patrick Nunamaker, Shawnee, OK (US); Ryan Joe Umber, Oklahoma City, OK (US); Willian Aristides Martinez, Oklahoma City, OK (US)

(73) Assignee: Southwest Electric Co., Oklahoma City, OK (US)

( * ) Notice: Subject to any disclaimer, the term of this patent is extended or adjusted under 35 U.S.C. 154(b) by 247 days.

(21) Appl. No.: 17/969,436

(22) Filed: Oct. 19, 2022

(65) Prior Publication Data

US 2023/0131007 A1    Apr. 27, 2023

Related U.S. Application Data

(60) Provisional application No. 63/270,803, filed on Oct. 22, 2021.

(51) Int. Cl.
*H01F 29/04* (2006.01)
*H01F 29/02* (2006.01)

(52) U.S. Cl.
CPC .......... *H01F 29/04* (2013.01); *H01F 29/025* (2013.01)

(58) Field of Classification Search
CPC ............................... H01F 29/04; H01F 29/025
See application file for complete search history.

(56) References Cited

U.S. PATENT DOCUMENTS

| 3,706,060 A | 12/1972 | Goodman |
| 4,574,231 A | 3/1986 | Owen |

(Continued)

FOREIGN PATENT DOCUMENTS

| CA | 2086650 A1 | 7/1994 |
| CN | 106410822 B | 12/2019 |

(Continued)

OTHER PUBLICATIONS

"Three-Phase HFL-DVR With Independently Controlled Phases"; IEEE Transactions on Power Electronics, vol. 27, No. 4, Apr. 2012 (Goharrizi et al.) Apr. 1, 2012.

(Continued)

*Primary Examiner* — Adolf D Berhane
*Assistant Examiner* — Afework S Demisse
(74) *Attorney, Agent, or Firm* — McAfee & Taft

(57) ABSTRACT

The present disclosure provides an exemplary three-phase multi-tap balancing distribution transformer capable of operation with both balanced and unbalanced loads and that provides a wide range of incremental voltages to compensate for the varying voltage drops and imbalances as the attached conductor length increases and allows users the ability to incrementally and independently adjust the voltage specifically feeding a specific phase. Incremental adjustment is achieved via the transformer and without any fragile or other external devices or components between the power source and load-side equipment terminals. The transformer, through the use of at least one phase-specific tap-change switch is capable of directly controlling the secondary voltage of the applicable phase independently from the other phases and, thus, does not affect the voltage on the other phases.

20 Claims, 5 Drawing Sheets

(56) References Cited

U.S. PATENT DOCUMENTS

| | | |
|---|---|---|
| 4,868,481 A | 9/1989 | Owen |
| 5,079,499 A | 1/1992 | Owen |
| 5,130,616 A | 7/1992 | Owen |
| 5,216,356 A | 6/1993 | Owen |
| 5,310,628 A | 5/1994 | Muenter et al. |
| 5,449,991 A | 9/1995 | Owen |
| 5,530,338 A | 6/1996 | Goodman |
| 5,557,249 A | 9/1996 | Reynal |
| 6,087,738 A | 7/2000 | Hammond |
| 6,169,674 B1 | 1/2001 | Owen |
| 6,177,803 B1 | 1/2001 | Train et al. |
| 6,566,769 B1 | 5/2003 | Layton |
| 7,250,743 B2 | 7/2007 | McVicar |
| 7,786,717 B2 | 8/2010 | Shimazu et al. |
| RE41,814 E | 10/2010 | Owne |
| 8,013,263 B2 | 9/2011 | Lindsey |
| 8,267,171 B2 | 9/2012 | Atherton |
| 9,190,846 B2 | 11/2015 | Eiland et al. |
| 9,407,093 B2 | 8/2016 | Cummings |
| 9,500,182 B2 | 11/2016 | Zagrodnik |
| 9,513,645 B2 | 12/2016 | Daley et al. |
| 10,177,672 B2 | 1/2019 | Daley et al. |
| 10,211,672 B2 | 2/2019 | Mouridsen |
| 10,374,505 B2 | 8/2019 | Wood |
| 11,128,278 B2 | 9/2021 | Crane et al. |
| 2003/0234639 A1* | 12/2003 | Ahuja .................... H01F 30/12 29/857 |
| 2005/0035838 A1* | 2/2005 | Owen .................... H01F 30/02 336/5 |
| 2005/0138797 A1* | 6/2005 | Ahuja .................... H01F 30/12 29/606 |
| 2006/0022783 A1 | 2/2006 | Owen |
| 2016/0041567 A1 | 2/2016 | Ko Thet et al. |
| 2020/0318463 A1 | 10/2020 | Grande, III |

FOREIGN PATENT DOCUMENTS

| | | |
|---|---|---|
| CN | 112821403 A | 5/2021 |
| EA | 025827 B1 | 2/2017 |
| JP | 2004088929 A | 3/2004 |
| WO | 2016148715 A1 | 9/2016 |
| WO | 2021097099 A1 | 5/2021 |

OTHER PUBLICATIONS

"Feasibility of Electronic Tap-Changing Stabilizers for Medium Voltage Lines—Precedents and New Configurations", IEEE Transactions on Power Delivery, vol. 24, No. 3, Jul. 2009 (Garcia et al.) Jul. 2009.

"Voltage and Cable Impedance Unbalance in Submergible Oil Well Pumps", IEEE Transactions on Industry Applications, vol. IA-20, No. 1, Jan./Feb. 1984 (Thomas R. Brinner) Feb. 1984.

"Electric Submergible Pumps", Developments in Petroleum Science, vol. 19, Part A, 1987; Chapter 16, pp. 737-799 (W.J. Powers, Clarence Dunbar, and George V. Chilingarian) May 2008.

Maschinenfabrik Reinhausen GMBH. "Deetap DU" . . . . 2017; [Retrieved on Dec. 16, 2022]. Retrieved from the internet <url:https://reinhausen.com/productdetail/de-energized-tap-changers/deetap-du>; pp. 1-2 Jan. 1, 2017.

PCT/US2022/047148, Southwest Electric Co., International Search Report and Written Opinion dated Mar. 1, 2023 Mar. 1, 2023.

* cited by examiner kVA __520__  HZ __350__  PHASES __3__

|  | VOLTAGE | AMPERES | kVBIL | COND. |
|---|---|---|---|---|
| PRIMARY | 480 | 625.5 | 30 | AL |
| SECONDARY | 1396 - 4836 | 215 - 62 | 60 | AL |

CORE GROUNDED INTERNALLY
CLASS ONAN    65°C RISE CONTINUOUS
TANK DESIGNED TO WITHSTAND +/- 7 PSIG
LIQUID LEVEL AT 25° IS 6" BELOW LID
IMPEDANCE _____ % AT 85° C TAP 3-C
INSULATING LIQUID (NON-PCB*)
    MINERAL OIL  240 GAL.    1800 LBS.
UNTANKING WEIGHT  2110  LBS.
TOTAL WEIGHT  5280  LBS.
MONTH/YEAR OF MANUFACTURE _____
DESIGNED FOR VARIABLE FREQUENCY APPLICATION
REFERENCE INSTRUCTION MANUAL SWE-IM-001

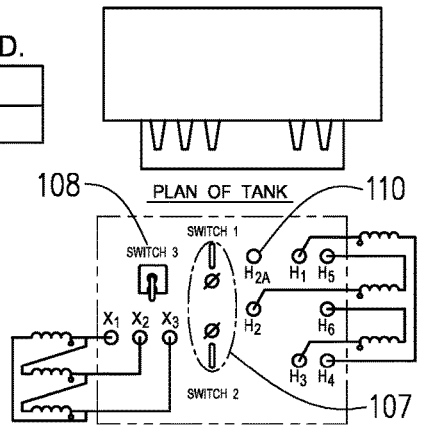

FRONT VIEW FACING TERMINAL CHAMBER

*CONTAINS NO DETECTABLE LEVEL OF PCB (LESS THAN 2 PPM) AT TIME OF MANUFACTURE

DE-ENERGIZE TRANSFORMER BEFORE CHANGING TAPS

| PRIMARY VOLTAGE ACROSS $X_1$-$X_2$-$X_3$ | | | SECONDARY VOLTAGE ACROSS $H_1$-$H_2$-$H_3$ | | | | | |
|---|---|---|---|---|---|---|---|---|
| | | | TAP POSITION | | | TAP POSITION | | |
| | | | SW1 | SW2 | △  ⊣ | | SW1 | SW2 | △  ⊣ |

| TAP POSITION SW1 | SW2 | △ | ⊣ | TAP POSITION SW1 | SW2 | △ | ⊣ |
|---|---|---|---|---|---|---|---|
| 1 | A | 1396 | 2419 | 3 | D | 2152 | 3728 |
| 1 | B | 1454 | 2519 | 3 | E | 2210 | 3828 |
| 1 | C | 1512 | 2619 | 4 | A | 2269 | 3929 |
| 1 | D | 1571 | 2720 | 4 | B | 2327 | 4030 |
| 1 | E | 1629 | 2821 | 4 | C | 2385 | 4131 |
| 2 | A | 1687 | 2922 | 4 | D | 2443 | 4231 |
| 2 | B | 1745 | 3022 | 4 | E | 2501 | 4332 |
| 2 | C | 1803 | 3123 | 5 | A | 2559 | 4433 |
| 2 | D | 1861 | 3224 | 5 | B | 2618 | 4534 |
| 2 | E | 1920 | 3325 | 5 | C | 2676 | 4634 |
| 3 | A | 1978 | 3425 | 5 | D | 2734 | 4735 |
| 3 | B | 2036 | 3526 | 5 | E | 2792 | 4836 |
| 3 | C | 2094 | 3627 | | | | |

480 V.

FIG. 3

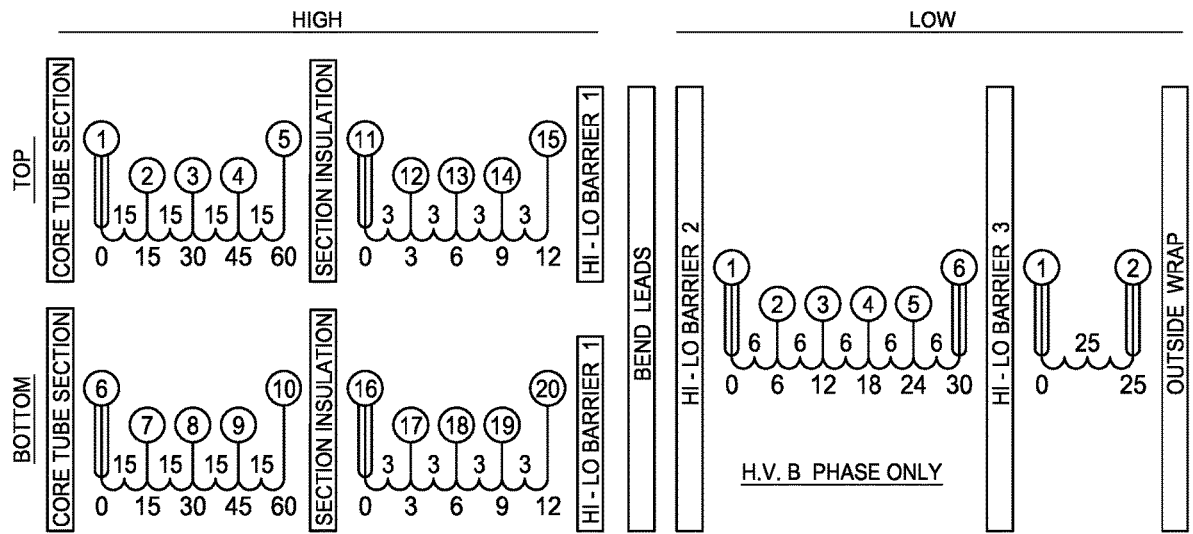
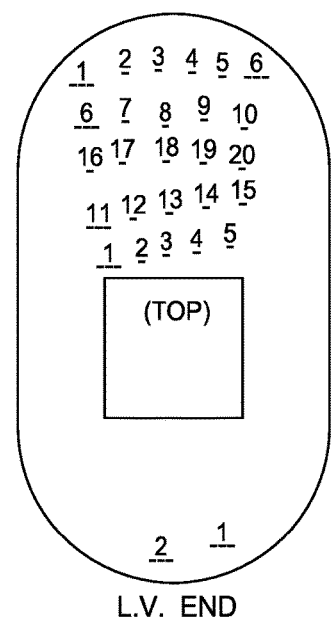
H.V. END
L.V. END
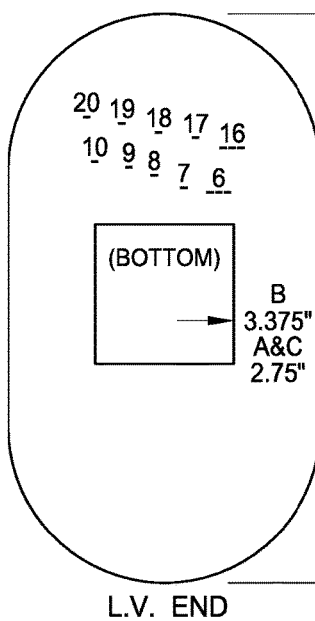
H.V. END
B 3.375"
A&C 2.75"
18.0"
L.V. END

THREE-PHASE MULTI-TAP BALANCING DISTRIBUTION TRANSFORMER

CROSS-REFERENCE TO RELATED APPLICATION

This application claims priority from U.S. Provisional Patent Application Ser. No. 63/270,803 filed on Oct. 22, 2021, the entire contents of which are incorporated in its entirety by reference.

TECHNICAL FIELD

The present disclosure relates generally to a transformer, and more particularly, without limitation, to a three-phase multi-tap balancing distribution transformer capable of being used with both balanced and unbalanced loads and is capable of independent adjustment of an output voltage of one or more phases independent from the other phases.

BACKGROUND

Multi-tap transformers may be connected to any type of conductor(s) that connect to any type of 3-phase/3-wire or 3-phase/4-wire equipment, such as a drive, motor, lighting, submersible pump, etc. The conductors may be a round cable oriented in an equilateral triangle configuration or a flat cable such as a three-phase flat oriented (3PFO) cable, where the conductor for each phase is side-by-side in the same plane with the other phases. Traditionally, in operation, it is better to operate with balanced loads. There are a number of reasons why a load may experience imbalance and such imbalance needs to be addressed.

For example, in some applications, like high-rise buildings, conductor length can be greater than 5000 feet (ft); and in certain applications, such as, well drilling in the oil and gas industry, mining industry, tunnel boring, or the like, the conductor lengths may be, for example, 5,000 ft-12,000 ft long. A three-phase inductive load connected at a terminal end of 3PFO conductor cable in excess of 3500 ft may experience a voltage imbalance, commonly between the center phase and outer phases, as the 3PFO conductor length increases. The center phase of 3PFO experiences less inductance than the outer phases, resulting in lower voltage drop on the center phase than the outer phases, and subsequently higher current on the center phase, and such current imbalance can reduce the operational life of the load-side equipment. Depending upon the conductor configuration used, it can be difficult to maintain rated voltage levels on the inductive load's terminals as the amplitude and angle of the voltage drops can vary between the phases of the conductors.

For example, when three individual round cables are oriented in an equilateral triangle configuration, the relative inductance of each phase will remain nearly the same, thereby allowing for approximately equal voltage drops across each phase at the inductive load-side equipment terminals. For example, in the application of drilling through thousands of feet of rock, the amount of space required to accommodate three round conductor cables in an equilateral triangle configuration is much larger, and as a result, more expensive, compared to using a 3PFO cable configuration. The same can be said in a high-rise building where conduit space is at a premium. 3PFO cable configuration has equal or even greater current-carrying capacity than the equilateral triangular configuration of individual round single-conductor cables and the needed footprint for 3PFO cables is significantly smaller. Accordingly, 3PFO cable is often utilized in applications where the conductor lengths are long and space is limited.

For example, when 3PFO cable is used in applications over distances exceeding 5,000 ft, the center phase often experiences lower inductance compared to its neighboring outer phases, which causes less voltage drop across the cable length of the center phase than the outer phases. This may also result in a voltage imbalance at the load-side equipment terminals, which leads to a current imbalance, and such current imbalance can reduce the operational life of the load-side equipment. The center phase in a 3PFO cable may also experience added inductive and heating effects from the outer two phases (and from itself) which can result in a different voltage drop at the load-side equipment terminals of the center phase compared to the voltage drop at the load-side equipment terminals of the outer two phases. This difference in voltage at the load-side equipment terminals results in even greater phase current imbalance, which can reduce the operational life and effectiveness of the load-side equipment.

For example, in the context of an oil and gas application, one approach to address the voltage imbalance includes applying external inductors between the power source and the 3PFO cables to balance the overall inductances seen at the load-side equipment terminals as described in U.S. Pat. No. 6,566,769, the entire contents of which are incorporated herein by reference. However, there is little evidence that such solution is used in today's drilling industry.

Other approaches include splicing the 3PFO cable approximately every 1,000 ft in order to rotate phases, with the corresponding cable for each phase being positioned in the center position of the 3PFO cable in the hope of balancing the overall voltages at the terminals of the load-side equipment. This solution is expensive and each splice creates a slightly larger overall footprint that must be accommodated by additional drilling.

In the context of high-rise buildings, conductors may be 3PFO or individual round cables; transformers may be mounted on the roof or upper levels of the structure, and as the length of the conductor cables increases, such load-side equipment may experience imbalance that needs to be countered in order to preserve the operational life of the load-side equipment.

SUMMARY

A three-phase, multi-tap transformer comprising: a primary side, the primary side configured to receive input power from a power source; a secondary side operably coupled with the primary side, the secondary side having output terminals for conveying output power to each phase, the secondary side having a plurality of taps thereon, wherein each tap corresponds to a different turns ratio between the primary side and the secondary side. The three-phase, multi-tap transformer includes a three-phase tap change switch operably coupled to the secondary side, wherein the three-phase tap change switch is configured to adjust a turns ratio between the primary side and the secondary side and thereby provide output power at varying voltage amounts. The three-phase, multi-tap balancing transformer includes a phase-specific balancing tap switch operably coupled to the secondary side, wherein the phase-specific balancing tap switch is configured to adjust an output voltage of an applicable phase by an incremental amount and independent of an output voltage of each of the other phases.

A three-phase, multi-tap transformer comprising: a primary side, the primary side configured to receive input power from a power source; a secondary side operably coupled with the primary side, the secondary side having output terminals for conveying output power to each phase, the secondary side having a plurality of taps thereon, wherein each tap corresponds to a different turns ratio between the primary side and the secondary side. The three-phase, multi-tap transformer includes two three-phase tap change switches operably coupled to the secondary side, wherein each three-phase tap change switch is configured to adjust a turns ratio between the primary side and the secondary side and wherein the two three-phase tap change switches enable up to twenty-five selectable tap positions. The three-phase, multi-tap transformer includes at least one phase-specific balancing tap switch operably coupled to the secondary side, wherein the at least one phase-specific balancing tap switch is configured to independently adjust an output voltage of an applicable phase from each of the other phases by a predefined incremental amount for each position of the two three-phase tap change switches.

BRIEF DESCRIPTION OF THE DRAWINGS

The figures included with this disclosure should not be viewed as exclusive representations or limiting of the subject matter disclosed herein. The subject matter disclosed is capable of modification or alteration in form and function, as will occur to those skilled in the art with the benefit of this disclosure.

FIG. 3 depicts example nameplate information for an exemplary three-phase multi-tap balancing distribution transformer.

FIG. 4 depicts example winding data configuration for an exemplary three-phase multi-tap balancing distribution transformer.

DETAILED DESCRIPTION

The present disclosure illustrates an exemplary three-phase, multi-tap distribution transformer that addresses the problems currently faced in various industries utilizing long conductors. The present disclosure provides an exemplary three-phase multi-tap balancing distribution transformer that provides a wide range of incremental voltages to compensate for the varying voltage drops and imbalances as conductor length increases and allows users the ability to adjust the voltage specifically feeding a specific phase. For example, the exemplary three-phase multi-tap balancing distribution transformer may be used in connection with 3PFO conductors and is configured to compensate imbalances experienced by the center phase. The exemplary three-phase, multi-tap distribution transformer addresses the imbalance by enabling adjustment to be achieved internally within the transformer and without any fragile or other external devices or components between the power source and load-side equipment terminals. As will be further described, the transformer, through the use of a phase-specific tap-change switch 108 is capable of directly controlling the secondary voltage of the applicable phase independent of the other phases. The exemplary three-phase multi-tap balancing distribution transformer of the present disclosure is capable of and provides the ability to be used with both balanced and unbalanced loads. Accordingly, the transformer of the present disclosure is configured to achieve relative phase voltage balance across the load terminals, e.g. within 5% of balance, and, in situations where 3PFO cables are used, the transformer of the present disclosure enables the ability to keep the 3PFO cable in its compact footprint.

Figure 1:
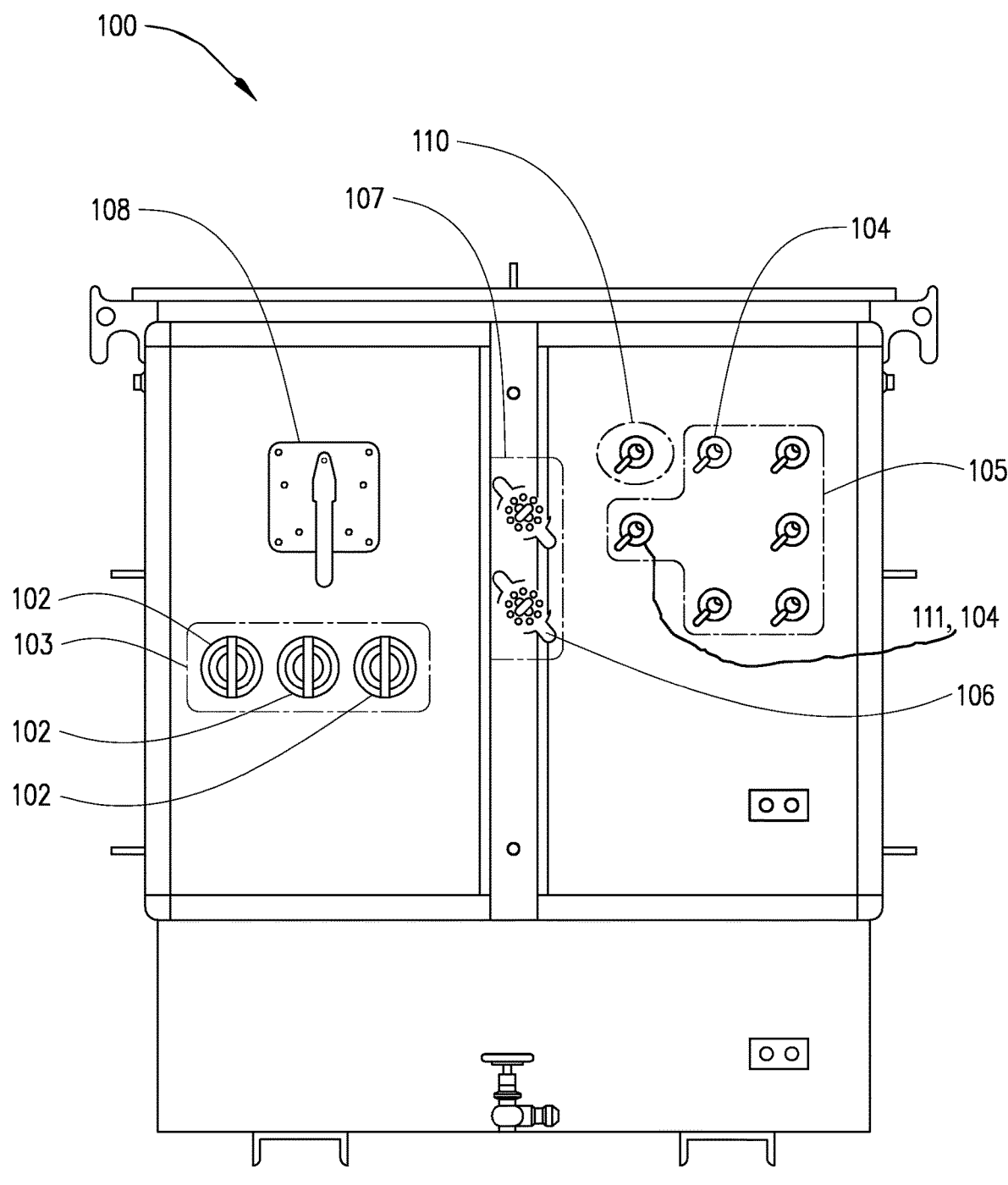
FIG. 1 depicts an example front profile of a pad-mounted three-phase multi-tap balancing distribution transformer cabinet with its doors removed.

FIG. 1 is illustrative of a pad-mounted three-phase multi-tap distribution transformer cabinet 100 with its doors removed. It should be noted that the present disclosure is not limited to pad-mounted transformers types, and other types, for example, substation design types, and the like are also suitable. The multi-tap transformer design of the present disclosure includes a primary side, the primary side configured to receive input power from a power source, and a secondary side operably coupled with the primary side. In use, the primary side and secondary side are operably coupled via electromagnetic induction. Input power from a power source is provided to three-phase multi-tap distribution transformer cabinet 100 via primary bushings 102. A grouping of the primary bushings 102 is illustrated in FIG. 1 and designated with reference numeral 103.

Figure 2A:
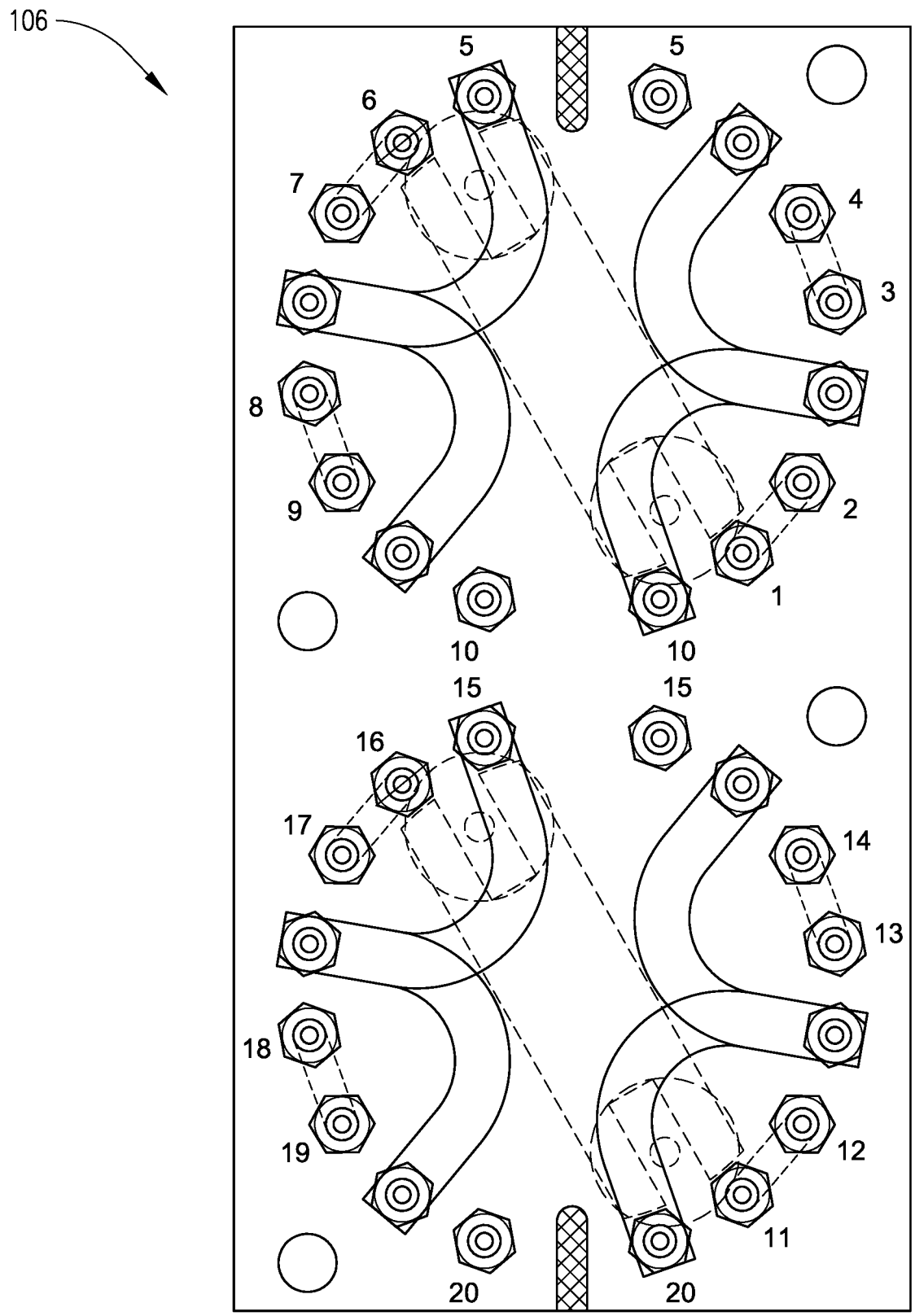
FIG. 2A depicts an example connection diagram of three-phase tap change switches configured to provide up to twenty-five different output voltage amounts.

The secondary side has output terminals for conveying output power to each phase. The secondary side includes a plurality of taps thereon, wherein each tap corresponds to a different turns ratio between the primary side and the secondary side of the transformer core's winding. The three-phase multi-tap distribution transformer includes at least two three-phase tap change switches 106. Each tap change switch 106 is operably coupled to the secondary side and is configured to adjust a turns ratio between the primary side and the secondary side and thereby provide output power at varying voltage amounts. For example, the output power of the transformer is a different voltage than a voltage of the input power, wherein the varying voltage amounts includes up to twenty-five different voltage amounts. For ease of illustration, reference number 107 corresponds to the grouping of three-phase tap change switches 106. The at least two three-phase tap change switches 106 enable a plurality of configurations that are capable of providing up to twenty-five (25) selectable tap positions and thereby resulting in up to twenty-five different voltage amounts. For example, Southwest Electric Co., with a current headquarter address of 6503 S.E. 74th Street, Oklahoma City, OK 73135, provides a multi-tap distribution transformer capable of providing up to twenty-five selectable tap positions under the FACT® trademark. FIG. 2A depicts an example connection diagram of group 107 of two three-phase tap change switches 106 shown from the backside of switches 106, i.e. in the interior of cabinet 100, with the contacts on position 1A. For example, as illustrated in FIG. 2A, the at least two three-phase tap change switches 106 are each depicted as a five (5)-position tap switch that are wired to enable the up to twenty-five (25) different selectable tap positions on the secondary side via the plurality of taps thereon. Actuation of each the at least two three-phase tap change switches 106 provide for coarse or broad adjustment of the output voltage of each of the three phases of the transformer.

The primary and secondary windings of the multi-tap distribution transformer are made of conductive material and are wrapped around one or more legs of a magnetic core, as is known in the art. The transformer's core configuration may be any core configuration known in the art, including but not limited to, for example, a 5-legged wound core transformer that includes a distributed gap core with coils (or windings) placed on the three inner legs; a stacked core; an EI-lamination core (also known as a scrapless lamination); a UI-lamination core; a shell-type core (where two UI-cores are put together to form a single phase core); and the like. The materials and laminations for the core configuration are any suitable dimensions and materials known in the art, including, without limitation, steel, silicon-grade steel, and the like. Depending upon the end-use application, the primary and secondary side may be configured to be in a plurality of configurations, including, without limitation, delta-delta, delta-wye, wye-wye, wye-delta, zig-zag, or grounded-wye configuration, any combination of the foregoing, or other configurations and combinations thereof known in the art.

Referring to FIG. 1, reference numeral 105 identifies a plurality of secondary bushings 104 that are output terminals for conveying output power of each phase from the secondary side.

The three-phase multi-tap distribution transformer design of the present disclosure also includes one or more phase-specific balancing tap switches 108 operably coupled to the secondary side and is configured to adjust an output voltage of an applicable phase by an incremental amount and independent of an output voltage of each of the other phases, and thus does not impact the voltage of the other phases. Phase-specific balancing tap switch 108 is configured to adjust a turns ratio of a single phase and enables fine, direct adjustment, e.g. reduction or addition, of the output power of a specific phase. For example, each phase may have a single phase-specific balancing tap switch 108 associated therewith and is configured to adjust the secondary voltage of an applicable phase by an incremental amount and independent of an output voltage of each of the other phases. The incremental amount may be a predefined amount, such as a fixed percentage amount of the applicable current tap setting, and may be anywhere between about 1% and up to and including about 10% of per switch position of the phase-specific balancing tap switch 108. Such predetermined amount may vary depending upon the end-use application of the transformer; for example, the predefined amount may be in 3% increments. For example, if phase-specific balancing tap switch 108 is a 5-position switch and the predefined amount for each position thereof is to be a 3% change, then Position 1 corresponds to an incremental adjustment of 3%; Position 2 corresponds to an incremental adjustment of 6%, Position 3 corresponds to an incremental adjustment of 9% Position 4 corresponds to an incremental adjustment of 12%, and Position 5 corresponds to an incremental adjustment of 15%. The predefined amount increments may vary depending upon the end-use application, and can range anywhere greater than 0% and up to and including 10%. For example, in some applications, the phase-specific balancing tap switch connections (and secondary side) are configured to reduce a phase voltage incrementally in order to achieve relative balance, such as a voltage difference between 0% and 5%, inclusive, across all terminals of a load, (e.g., to have the load be within about 5% of balance), and thereby result in more negligible current imbalance on the load-side equipment. For example, adjustment may be done in 3% increments, 5% increments, or any other suitable amount, in order to achieve relative balance, for example, within about 5% voltage difference across the load's terminals, which should also yield similar current balance across the same terminals. As noted, the incremental adjustment provided by phase-specific balancing tap switch 108 is available for each position of tap change switch 106. Additionally, such incremental adjustment provided by phase-specific balancing tap switch 108 may not correspond to amounts depicted in a transformer's nameplate information.

The predetermined incremental amount for phase-specific balancing tap switch 108 may be different for one or more phases or may be the same for one or more phases, or any combination of the foregoing. Each phase may have a phase-specific balancing tap switch 108 associated therewith thereby enabling independent adjustment of one or more phases. FIG. 1 depicts a single phase-specific balancing tap switch 108, and such phase-specific balancing tap switch 108 is associated with a single phase. Phase-specific balancing tap switch 108 is configured to operate at any setting of the at least two tap change switches 106. Again, phase-specific balancing tap switch 108 provides to independent adjustment of the particular phase it is associated therewith.

Bushing 110 is representative of a bushing associated with phase-specific balancing tap switch 108 for conveying output power of the phase associated with its applicable phase-specific balancing tap switch 108. For example, depending upon the end-use application (as the load terminals experience imbalance and incremental adjustment is needed on a particular phase), the operator will need to use the appropriate secondary bushing corresponding to the phase-specific tap change switch and thereby adjust the applicable phase in order to achieve relative balance across the load terminals. If a user desires to utilize the independent, fine-adjustment feature provided by phase-specific balancing tap switch 108, the corresponding secondary bushing 110 is used, meaning that the corresponding standard secondary bushing 104 for the same applicable phase is not used. If fine-adjustment through the phase-specific balancing tap switch 108 is not desired (or the load is not experiencing imbalance), then a user will utilize the standard secondary bushing 104 for the applicable phase and not the applicable secondary bushing 110 for that particular phase. For example, in FIG. 1, secondary bushing 110 corresponds to the bushing for the center phase that is used in connection with phase-specific balancing tap switch 108, and the standard secondary bushing 104 that is also designated as 111 corresponds to the standard secondary bushing for the center phase when bushing 110 is not used. Not depicted in the figures is an example where more than one phase has a phase-specific balancing tap switch 108 associated therewith; in such configuration, a corresponding secondary bushing 110 for that particular phase will be used (and the standard secondary bushing 104 associated with the corresponding phase will not be used).

Figure 2B:
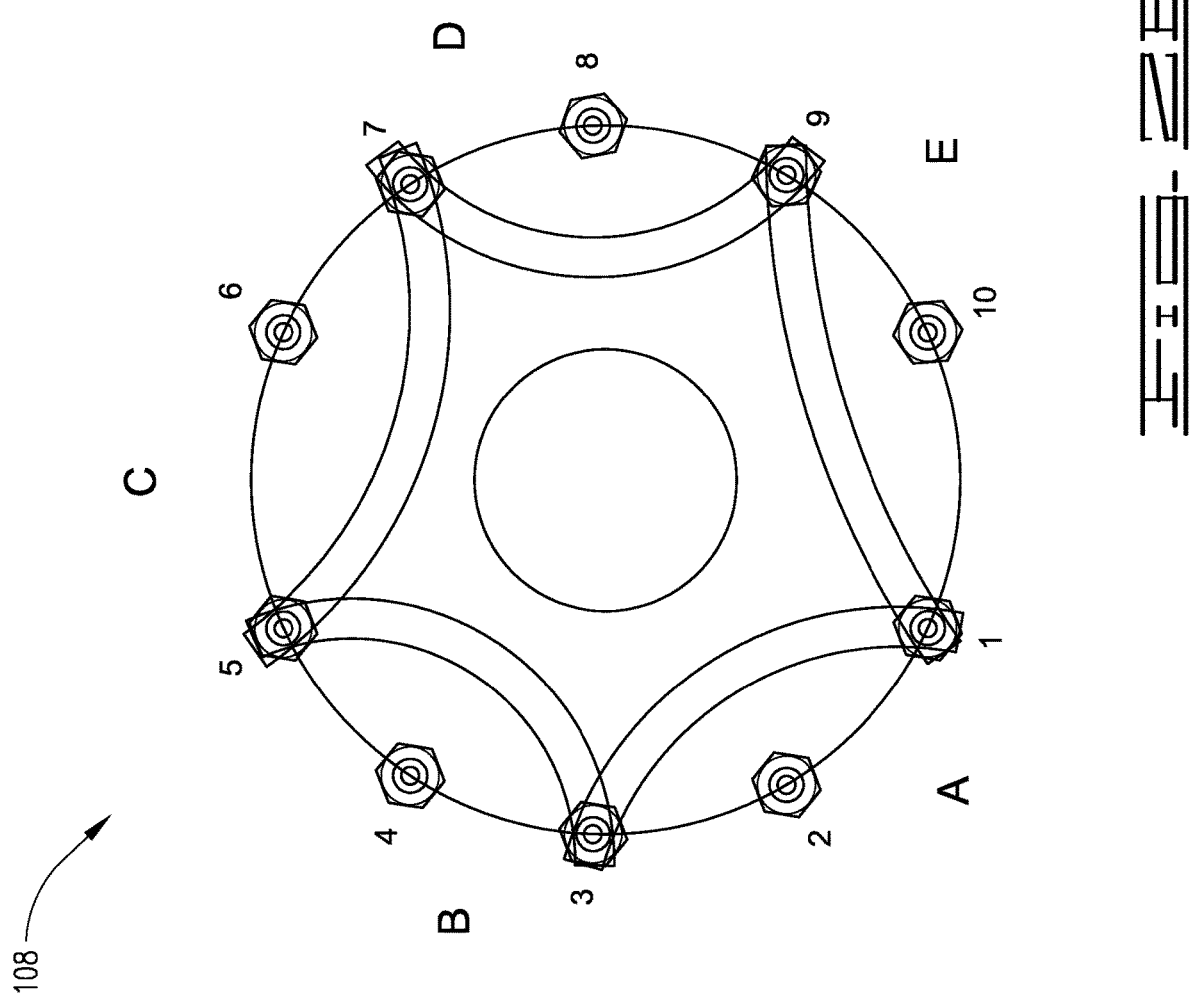
FIG. 2B depicts an example connection diagram for a phase-specific balancing tap switch configured for independent voltage adjustment for a single phase.

Additional single-phase leads (or taps) are connected on additional turns layers of the transformer's core and operably connected to a phase-specific balancing tap switch 108. The exemplary and non-limiting phase-specific balancing tap switch 108 in the figures is depicted as a 5-position switch. The 5-position switch is a ten-post switch. As previously described, phase-specific balancing tap switch 108 allows the applicable phase's secondary voltage to be incrementally adjusted, either increased or reduced, a predefined amount for every tap switch position. FIG. 2B depicts an example backside and connection diagram for phase-specific balancing tap switch 108 configured for independent voltage adjustment for a single phase.

For example, phase-specific balancing tap change switch 108 may be a 5-position switch, including but not limited to a 5-position, 10-post electrically linear switch. Phase-specific balancing tap switch 108 is not limited to a 5-position, 10-post switch and any other switches capable of achieving the described functionality to enable incremental adjustment of the phase voltages are also suitable. Phase-specific balancing tap switch 108 enables fine-tuning or smaller adjustment for the applicable phase it is associated with via impacting the turns ratio of the particular phase's winding. Additional (or fewer) turns to the phase are determined by the desired predetermined amount of adjustment of phase-specific balancing tap switch 108. Phase-specific balancing tap switch 108 is configured to provide finer adjustment compared to the broader adjustment provided by each of the three-phase tap switches 106. Phase-specific balancing tap switch 108 enables adjustment of the applicable phase independent of the other phases and thereby provides flexibility to adjust one or more phases different from the other phases. Phase specific balancing tap switch 108 may be applied to any desired phase and it is possible to have more than one phase-specific balancing tap switch, e.g., one for each phase.

Non-limiting examples phase-specific balancing tap switches 108 may include switches having at least 2 or more positions, at least 3 or more positions, at least 4 or more positions, at least 5 or more positions, at least 6 or more positions, at least 7 or more positions, at least 8 or more positions, at least 9 or more positions, or the like. For example, in some applications phase-specific balancing tap switch 108 is a switch having at least five or more positions.

As previously mentioned, phase-specific balancing tap switch 108 allows incremental adjustment of a single-phase's secondary voltage and can be applied to any phase or one or more phases. For example, in some applications, due to the unique inductive nature the center phase experiences in 3PFO cable as the conductor length increases compared to the outer phases, it may be more preferable to utilize phase-specific balancing tap switch 108 in connection with the center phase secondary. The present disclosure illustrates a single phase-specific balancing tap switch 108, such disclosure is not so limited; additional phase-specific balancing tap switches 108 and the associated secondary bushings 110 can also be implemented for the other phases and such implementation will be the same as described herein with respect to the single-phase balancing tap switch discussed herein.

For example, each three-phase tap change switch 106 and phase-specific balancing tap switch 108 may be connected to copper leads (or any other leads made of suitable material) to provide operable connection with the applicable conductor layers to produce the desired voltage variances. Such connections may be achieved via cold-weld, hot-weld, or any other connection technique and mechanism known in the art.

The described transformer design can apply to a wide range of transformers ratings, non-limiting examples include: power capacity ratings of 75 kilovolt-amperes (kVA)-10,000 kVA, basic lightning impulse insulation level (BIL) ratings of 30 kiloVolt (kV)-200 kV. Other suitable transformers include a variety of power capacities, e.g., 75 kVA-5,000 kVA, operating frequency, e.g. 50 hertz (Hz)-400 Hz, and primary and secondary voltage ranges, e.g. 480 V-38,000 V. For example, depending upon the application, the transformer has an operating frequency of 50 Hz to 400 Hz, and the output power has a voltage between 480 V-38,000 V. For example, a non-limiting exemplary transformer may be a 520 kVA 3-phase transformer with a multi-tap secondary voltage range of 1,396V-4,836V, such as the one described in Example 1.

Example 1

FIG. 3 depicts nameplate information for an exemplary multi-tap distribution transformer design having a 480 V delta-connected primary winding with a multi-tap wye-connected and delta-connected secondary bushing having a secondary voltage range of 2,419V-4,836V and 1,396V-2,792V, respectively.

FIG. 4 is illustrative of the winding data configuration for such an exemplary transformer. In this example, Phase B is the center phase and bushing 110 is operably associated with phase-specific balancing tap switch 108. For such a transformer, each of these 3-phase leads are connected between various turns of the secondary winding and three-phase tap change switches 106 and balancing tap switch 108, as applicable.

Tables 1 and 2 are turns ratio tables for the transformer associated with the nameplate information depicted in FIG. 3 in this example.

TABLE 1

3-phase ratio table

| Tap Position | Volts Ratio | Turns Ratio | Phase Angle Maximum | Phase Angle Minimum |
|---|---|---|---|---|
| 1-A | 2.908 | 2.880 | 2.885 | 2.875 |
| 2-B | 3.635 | 3.600 | 3.605 | 3.595 |
| 3-C | 4.363 | 4.320 | 4.325 | 4.315 |
| 4-D | 5.090 | 5.040 | 5.045 | 5.035 |
| 5-E | 5.817 | 5.760 | 5.765 | 5.755 |

TABLE 2

B phase-specific single-phase ratio

| Tap Position | HV Turns | LV Turns | Turns Ratio | Maximum | Minimum |
|---|---|---|---|---|---|
| 1 | 66 | 25 | 2.640 | 2.645 | 2.635 |
| 2 | 60 | 25 | 2.400 | 2.405 | 2.395 |
| 3 | 54 | 25 | 2.160 | 2.165 | 2.155 |
| 4 | 48 | 25 | 1.920 | 1.925 | 1.916 |
| 5 | 42 | 25 | 1.680 | 1.685 | 1.675 |

Example 2

Exemplary measurements and calculations for a transformer having the nameplate information depicted in FIG. 3 was conducted. The input on X1-X2-X3: is 480V nominal; and three-phase tap switches 106, which are illustrated in FIG. 3 as SW1 and SW2, were set to position 5E and testing was performed at 350 Hz. The testing was performed at ten percent (10%) of the input voltage; accordingly, all numbers can be multiplied by ten to get the corresponding nameplate values illustrated in FIG. 3. The LV turns (X1-X2-X3) were 25 turns and HV turns (H1-N, H2-N, H3-N) were 144 turns as illustrated in FIG. 4, and between for H2A-N, the turns were as illustrated in FIG. 4. Testing was performed with no load and measured from the bushing terminals with a calibrated multi-meter.

In this example, the phase-specific tap change switch was configured to apply a reduction in voltage to the center phase of approximately 5% per position for either a delta-configured or a wye-configured secondary. The secondary voltage was measured across H1-H2-H3 and H1-H2A. For each of the five positions of the phase-specific tap change switch, the predefined amount of reduction in voltage to the center phase for each position of phase-specific tap change switch is as follows: position 1—0% change; position 2—5% reduction; position 3—10% reduction; position 4—15% reduction; and position 5—20% reduction. Table 3 illustrates the measured input voltages (10% of rated input voltage across X1-X2-X3) and two sets of output voltages for both calculated and measured voltages (both Delta and Wye secondary configurations).

For each position of phase-specific tap change switch, Table 3 illustrates the percent difference between the measured output voltages and the calculated theoretical output voltages (the extrapolated input voltage at tap position 5E). The percent difference for the line labeled "H2A-H1" indicates the percent difference between the measured H2A voltage and the calculated X1-X2 voltage and demonstrates the voltage reduction caused by the phase-specific tap change switch. For example, in the Tap 5 portion of Table 3, the PERCENT DIFFERENCE column shows for the "H2A-H1" a difference of −20.9%, indicating the measured voltage was about 20% lower than the calculated voltage would have been absent the phase-specific tap change switch.

While the table illustrates that the percent difference for each position is not exactly equal to the expected predefined amount, such variation is expected due to the general variability in transformers such as windings not being identical or other imperfections. This example is also illustrative of adjusting a single phase without adjusting the other phases as described in the present disclosure. As noted above, this example is illustrative of having 6 turns between each position as depicted in FIG. 4. Such value is exemplary and should not be construed as limiting. Whatever the value of turns selected, the ultimate resulting turns are a whole integer. It should be appreciated that depending upon the end-use application or desired predefined amount to be achieved, the percent difference could be more or less, depending upon the number of turns selected for the desired incremental adjustment amount. For example, for lower number of turns available, the less accurate in percent difference will be. As noted above, the predefined amount increments may vary depending upon the end-use application, and can range anywhere greater than 0% and up to and including 10%. For example, in some applications, the phase-specific balancing tap switch connections (and secondary side) are configured to adjust a phase voltage incrementally in order to achieve relative balance, such as a voltage difference between 0% and 5%, inclusive, across all terminals of a load, (e.g., to have the load be within about 5% of balance).

TABLE 3

| Theoretical Values (Volts) | | | |
|---|---|---|---|
| APPLY | MEASURED | DELTA CALCULATED VOLTS ON TAP 5E | WYE CALCULATED VOLTS ON TAP 5E |
| X1-X2 | 49.27 | 283.80 | 491.53 |
| X2-X3 | 48.15 | 277.34 | 480.36 |
| X3-X1 | 48.60 | 279.94 | 484.85 |

TABLE 3-continued

| Measured Values (Volts) (TAP 1:0%) | | | |
|---|---|---|---|
| | DELTA | WYE | PERCENT DIFFERENCE |
| H1-H2 | 280.00 | 485.0 | −1.3% |
| H2-H3 | 283.50 | 491.0 | 2.2% |
| H3-H1 | 277.50 | 480.6 | −0.9% |
| H2A-H1 | 272 | 471.1 | −4.2% |

| Theoretical Values (Volts) | | | |
|---|---|---|---|
| APPLY | MEASURED | DELTA CALCULATED VOLTS ON TAP 5E | WYE CALCULATED VOLTS ON TAP 5E |
| X1-X2 | 49.08 | 282.70 | 489.64 |
| X2-X3 | 48.65 | 280.22 | 485.35 |
| X3-X1 | 48.50 | 279.36 | 483.85 |

| Measured Values (Volts) (TAP 2:5%) | | | |
|---|---|---|---|
| | DELTA | WYE | PERCENT DIFFERENCE |
| H1-H2 | 279.40 | 483.9 | −1.2% |
| H2-H3 | 282.50 | 489.3 | 0.8% |
| H3-H1 | 280.10 | 485.1 | 0.3% |
| H2A-H1 | 259 | 448.6 | −8.4% |

| Theoretical Values (Volts) | | | |
|---|---|---|---|
| APPLY | MEASURED | DELTA CALCULATED VOLTS ON TAP 5E | WYE CALCULATED VOLTS ON TAP 5E |
| X1-X2 | 49.12 | 282.93 | 490.04 |
| X2-X3 | 48.65 | 280.22 | 485.35 |
| X3-X1 | 48.52 | 279.48 | 484.05 |

| Measured Values (Volts) (TAP 3:10%) | | | |
|---|---|---|---|
| | DELTA | WYE | PERCENT DIFFERENCE |
| H1-H2 | 279.40 | 483.9 | −1.2% |
| H2-H3 | 282.70 | 489.6 | 0.9% |
| H3-H1 | 280.20 | 485.3 | 0.3% |
| H2A-H1 | 247.5 | 428.7 | −12.5% |

| Theoretical Values (Volts) | | | |
|---|---|---|---|
| APPLY | MEASURED | DELTA CALCULATED VOLTS ON TAP 5E | WYE CALCULATED VOLTS ON TAP 5E |
| X1-X2 | 49.18 | 283.28 | 490.64 |
| X2-X3 | 48.71 | 280.57 | 485.95 |
| X3-X1 | 48.55 | 279.65 | 484.35 |

| Measured Values (Volts) (TAP 4:15%) | | | |
|---|---|---|---|
| | DELTA | WYE | PERCENT DIFFERENCE |
| H1-H2 | 279.50 | 484.1 | −1.3% |
| H2-H3 | 283.30 | 490.7 | 1.0% |
| H3-H1 | 280.50 | 485.8 | 0.3% |
| H2A-H1 | 236.1 | 408.9 | −16.7% |

| Theoretical Values (Volts) | | | |
|---|---|---|---|
| APPLY | MEASURED | DELTA CALCULATED VOLTS ON TAP 5E | WYE CALCULATED VOLTS ON TAP 5E |
| X1-X2 | 49.19 | 283.33 | 490.74 |
| X2-X3 | 48.7 | 280.51 | 485.85 |
| X3-X1 | 48.53 | 279.53 | 484.15 |

TABLE 3-continued

Measured Values (Volts) (TAP 5:20%)

|  | DELTA | WYE | PERCENT DIFFERENCE |
|---|---|---|---|
| H1-H2 | 279.40 | 483.9 | −1.4% |
| H2-H3 | 283.30 | 490.7 | 1.0% |
| H3-H1 | 280.50 | 485.8 | 0.3% |
| H2A-H1 | 224.2 | 388.3 | −20.9% |

As illustrated by this example, the corresponding output voltage associated with the phase-specific balancing tap switch (H2A-H1) does not correspond to the voltage shown in the nameplate information. As described in the present disclosure, the phase-specific tap change switch is capable of providing incremental adjustment of a specific phase independent of the other phases. A transformer having one or more phase-specific tap change switches is capable of use with both balanced and unbalanced loads.

The use of ordinal number terminology (i.e., "first," "second," "third," "fourth," etc.) is for the purpose of differentiating between two or more items and is not meant to imply any sequence or order or importance to one item over another or any order of addition. The use of the phrase "or combinations thereof" as used herein refers to all permutations and combinations of the listed items preceding the term. The skilled artisan will understand that typically there is no limit on the number of items or terms in any combination, unless otherwise apparent from the context.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Although certain steps or logic flows may be described herein and/or illustrated in the figures as occurring sequentially, some steps or logic flows may occur simultaneously with each other or in an order that is not depicted or described to achieve the described results. Other steps may be provided, or steps may be eliminated from the described disclosure, and other components may be added to, or removed from, the various examples of the systems and methods of the present disclosure.

While various implementations have been described herein, such descriptions are presented by way of example and are not to be limited to the precise descriptions, illustrations, and end-use applications. Accordingly, numerous modifications and variations are possible by those skilled in the art without departing from the spirit and scope hereof, as defined by the following and later-submitted claims and their equivalents.

What is claimed is:

1. A three-phase, multi-tap transformer comprising:
a primary side, the primary side configured to receive input power from a power source;
a secondary side operably coupled with the primary side, the secondary side having output terminals for conveying output power to each phase, the secondary side having a plurality of taps thereon, wherein each tap corresponds to a different turns ratio between the primary side and the secondary side;
a three-phase tap change switch operably coupled to the secondary side, wherein the three-phase tap change switch is configured to adjust a turns ratio between the primary side and the secondary side and thereby provide output power at varying voltage amounts; and
a phase-specific balancing tap switch operably coupled to the secondary side, wherein the phase-specific balancing tap switch is configured to adjust an output voltage of an applicable phase by an incremental amount and independent of an output voltage of each of the other phases.

2. The three-phase, multi-tap transformer of claim 1, wherein the phase-specific balancing tap switch is configured to adjust a turns ratio of a single phase.

3. The three-phase, multi-tap transformer of claim 1, wherein the incremental amount is a predefined amount.

4. The three-phase, multi-tap transformer of claim 3, wherein the predefined amount is between 1% and 10%.

5. The three-phase, multi-tap transformer of claim 3, wherein the predefined amount is 3%.

6. The three-phase, multi-tap transformer of claim 3, wherein the predefined amount is 10%.

7. The three-phase, multi-tap transformer of claim 1, further comprising at least two three-phase tap change switches and the at least two three-phase tap change switches enable up to twenty-five different selectable tap positions.

8. The three-phase, multi-tap transformer of claim 1, wherein the phase-specific balancing tap switch is a switch having at least five or more positions.

9. The three-phase, multi-tap transformer of claim 1, wherein the phase-specific balancing tap switch is a five-position switch.

10. The three-phase, multi-tap transformer of claim 9, wherein the five-position switch is a ten-post switch.

11. The three-phase, multi-tap transformer of claim 1, wherein the phase-specific balancing tap switch is configured to adjust a phase voltage incrementally to achieve a voltage difference between 0% and 5%, inclusive, across terminals of a load.

12. The three-phase, multi-tap transformer of claim 1, wherein the transformer has an operating frequency of 50 hertz to 400 hertz.

13. The three-phase, multi-tap transformer of claim 1, wherein each three-phase tap change switch is a 5-position switch.

14. The three-phase, multi-tap transformer of claim 1, wherein the primary and secondary side are in a delta-delta, delta-wye, wye-wye, wye-delta, or zig-zag configuration.

15. The three-phase, multi-tap transformer of claim 1, wherein the output power has a voltage between 480 volts to 38,000 volts.

16. A three-phase, multi-tap transformer comprising:
a primary side, the primary side configured to receive input power from a power source;
a secondary side operably coupled with the primary side, the secondary side having output terminals for conveying output power to each phase, the secondary side having a plurality of taps thereon, wherein each tap corresponds to a different turns ratio between the primary side and the secondary side;
two three-phase tap change switches operably coupled to the secondary side, wherein each three-phase tap change switch is configured to adjust a turns ratio between the primary side and wherein the two three-phase tap change switches enable up to twenty-five selectable tap positions; and at least one phase-specific balancing tap switch operably coupled to the secondary side, wherein the at least one phase-specific balancing tap switch is configured to independently adjust an output voltage of an applicable phase from each of the other phases by a predefined incremental amount for each position of the two three-phase tap change switches.

17. The three-phase, multi-tap transformer of claim 16, wherein the predefined incremental amount is between 1% and 10%.

18. The three-phase, multi-tap transformer of claim 16, wherein the phase-specific balancing tap switch is a five-position, ten-post switch.

19. The three-phase, multi-tap transformer of claim 16, wherein the phase-specific balancing tap switch is a switch having at least five or more positions.

20. The three-phase, multi-tap transformer of claim 16, wherein the transformer has an operating frequency of 50 hertz to 400 hertz and wherein the output power has a voltage between 480 volts to 38,000 volts.

* * * * *